United States Patent [19]

Kittle et al.

[11] Patent Number: 4,640,368
[45] Date of Patent: Feb. 3, 1987

[54] DRAFT SENSOR INCLUDING STRAIN SENSOR COUPLED TO LOAD STRAP

[75] Inventors: Carl E. Kittle, Cedar Falls; Arthur J. LaFave; David L. Olson, both of Waterloo, all of Iowa

[73] Assignee: Deere & Company, Moline, Ill.

[21] Appl. No.: 834,002

[22] Filed: Feb. 27, 1986

[51] Int. Cl.⁴ ............................................. A01B 63/112
[52] U.S. Cl. .................... 172/430; 73/862.57; 73/862.65; 172/7
[58] Field of Search ............... 172/7, 9, 10, 11, 12, 172/430; 280/446 A; 73/768, 862.45, 862.47, 862.48, 862.54, 862.57, 862.64, 862.65, 862.68

[56] References Cited

U.S. PATENT DOCUMENTS

| | | | |
|---|---|---|---|
| 3,246,701 | 4/1966 | Schulz | 172/9 |
| 4,142,733 | 3/1979 | Bernini | 280/446 A |
| 4,271,910 | 6/1981 | Schafer | 172/7 |
| 4,367,656 | 1/1983 | Fritsch | 73/862.65 |
| 4,386,533 | 6/1983 | Jackson et al. | 73/862.64 |
| 4,499,775 | 2/1985 | Lasoen | 73/862.57 |
| 4,530,245 | 7/1985 | Jacobson | 73/768 |

FOREIGN PATENT DOCUMENTS 1304261  1/1973  United Kingdom ............ 172/7

Primary Examiner—Richard T. Stouffer

[57] ABSTRACT

A draft force sensor includes a bracket fixed to a tractor frame part. The bracket includes a pair of laterally-spaced legs which support a shaft to which is coupled the fore-end of a draft link. An end of the shaft is coupled to one end of a load strap. The other end of the load strap is pinned at the bracket to allow fore-and-aft loading of the strap from the shaft. A strain sensor is received in an aperture in a central portion of the load strap.

5 Claims, 5 Drawing Figures

DRAFT SENSOR INCLUDING STRAIN SENSOR COUPLED TO LOAD STRAP

BACKGROUND OF INVENTION

The present invention relates to an improved device for sensing draft forces for use in a tractor draft control system.

Various mechanisms for sensing draft force have been proposed in the prior art. U.S. Pat. No. 4,271,910 (issued June 9, 1981 and assigned to the assignee of this invention) describes a draft sensor wherein a draft link is coupled to a bracket fixed to a tapered load pin. Twisting of the load pin moves an arm connected to potentiometer type displacement transducer. Such a system suffers from a lack of compactness and its parts are subject to damage due to their exposure at the rear of the tractor. Another type of draft sensor is the parallel plate type which is inserted into the draft link itself. One such sensor is described in U.S. Pat. No. 4,386,533 issued June 7, 1983 and assigned to the assignee of this invention. The operation of such sensors is adversely effected by hysteresis and bending of the draft links. Also, the parts of such sensors must be sized large enough to withstand the total draft force transmitted by the draft link. Another known system includes a strain sensor in a shear pin which is received by the draft links. Use of such a system requires the use of non-standard hitch parts, thus increasing cost.

SUMMARY OF INVENTION

One object of the present invention is to provide a compact draft force sensor.

Another object of the present invention is to provide such a sensor which utilizes a commercially available strain sensor.

Another object is to provide such a sensor which can be used with standard hitch system components.

These and other objects are achieved by the present invention which includes a bracket which is bolted to the side of a frame structure near the rear of a tractor. The bracket includes a pair of laterally spaced apart legs. A shaft extends through bores in the legs and includes an outer end which projects outwardly of the outer one of the legs. The foreward end of a draft link is pivotally connected to the shaft between the legs. A fore-and-aft extending load strap has a forward end which is mounted on a pin which projects from the forward end of the bracket. The aft end of the load strap has a bore which receives the outer end of the shaft. The central portion of the load strap has a bore which receives a strain sensor. A pair of walls extend along opposite sides of the load strap. A cover is fixed to the walls to shield the load strap from the enviroment.

DETAILED DESCRIPTION

Figure 1:
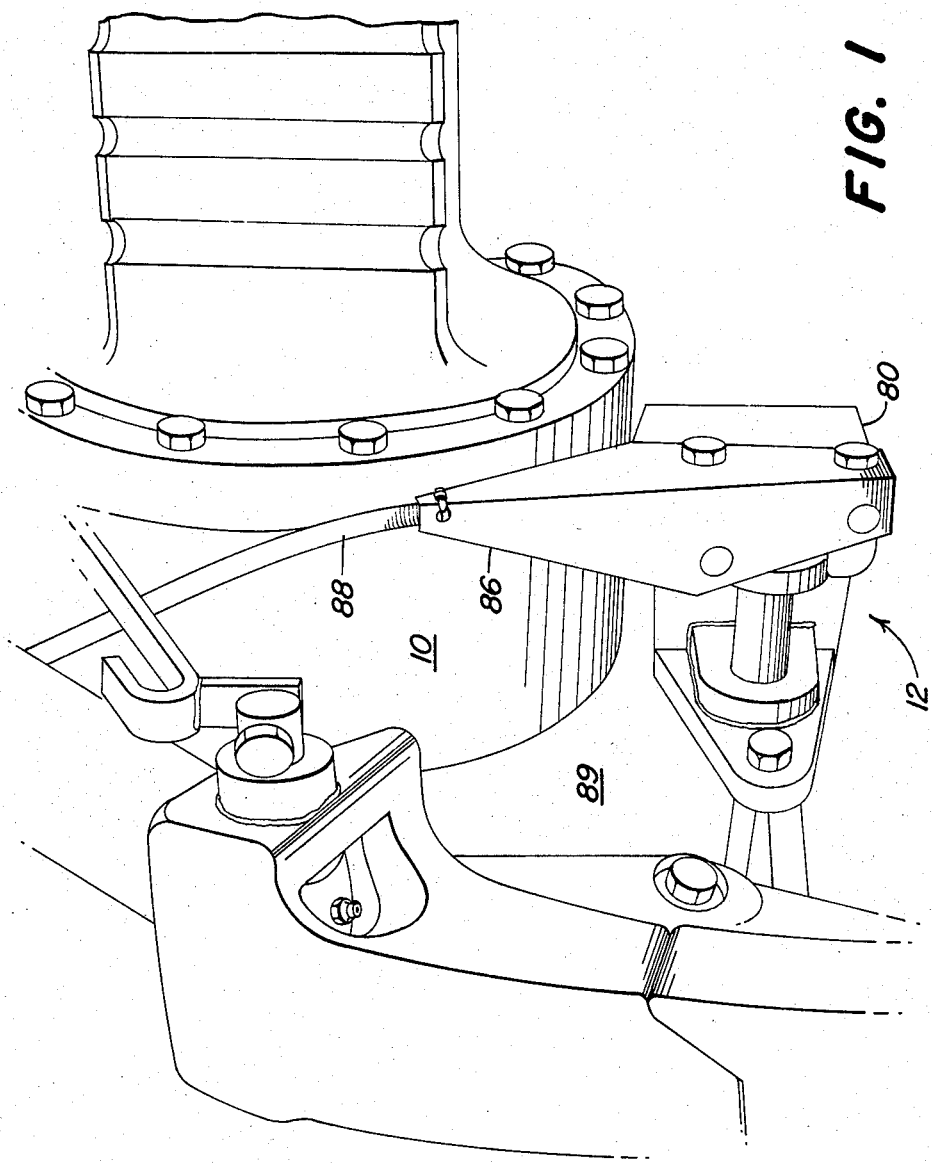
FIG. 1 is a rear view of a tractor's transmission case housing upon which is mounted the present load sensor invention.

FIG. 1 shows a portion of an agricultural tractor including part of the right side of the rear axle housing 10. The draft force sensor 12 of the present invention is bolted to the transmission case housing 89 generally below and to the rear of the rear axle. Only the right hand draft sensor is seen in FIG. 1, it being understood that a similar draft sensor would also be attached to the left side (not shown) of the transmission case housing.

Figure 2:
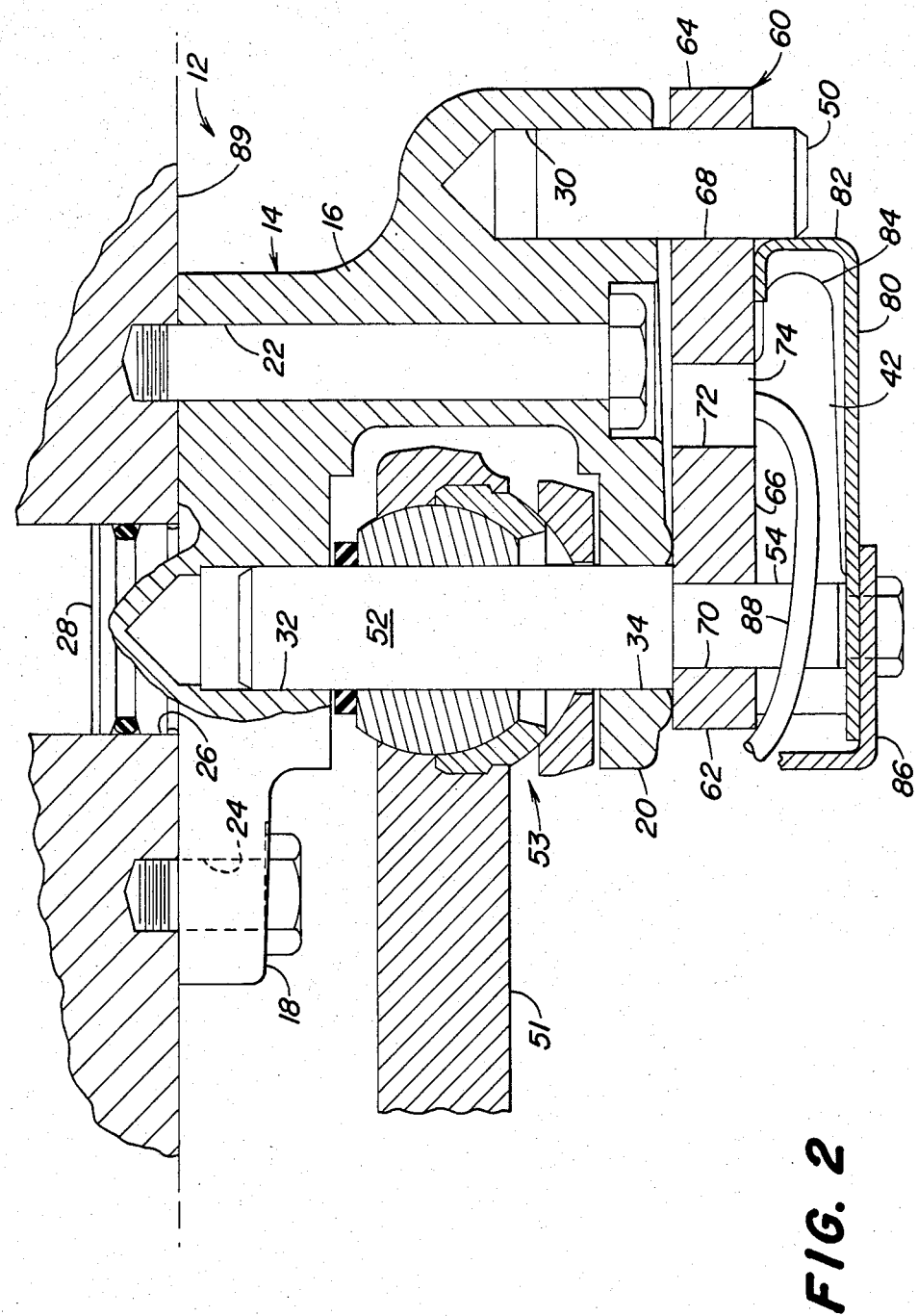
FIG. 2 is a partial cross sectional view looking downward toward the present invention.
Figure 3:
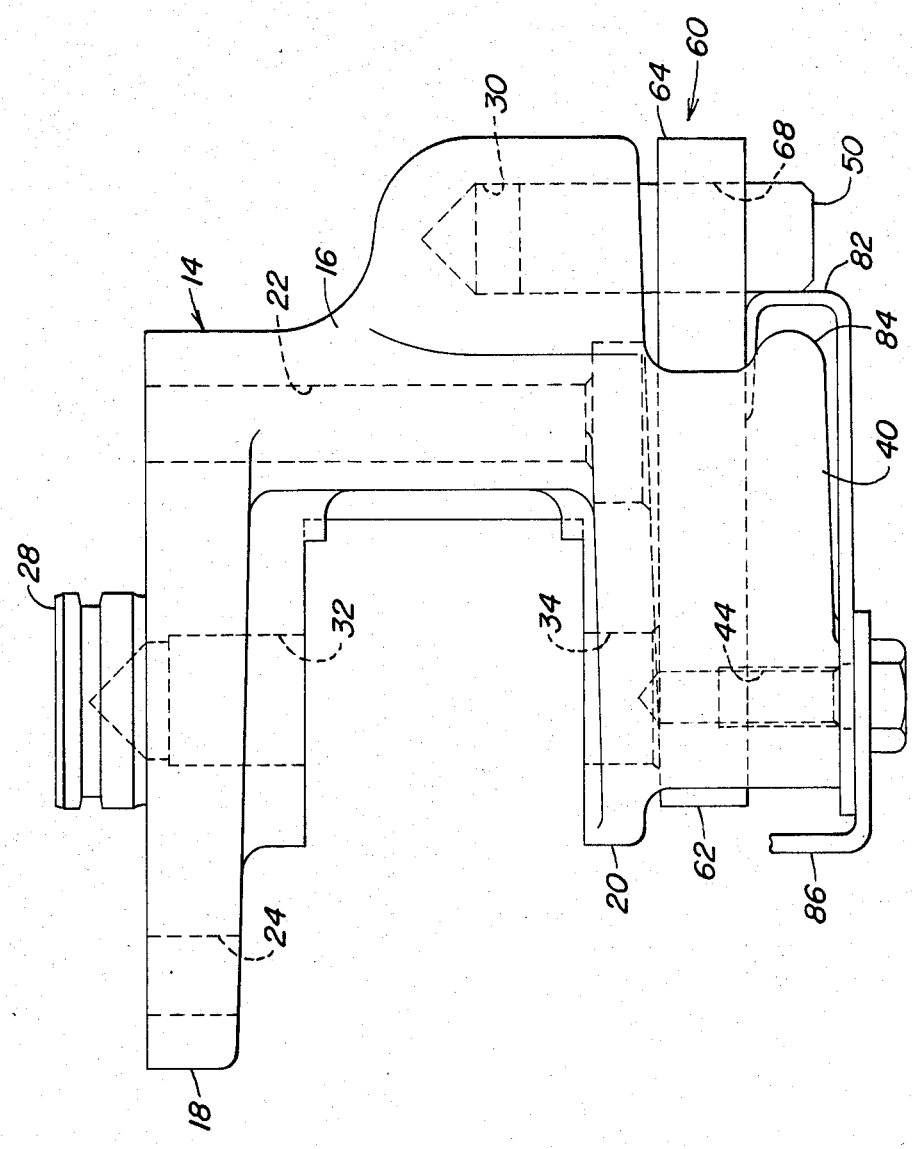
FIG. 3 is a top view of the present invention.
Figure 4:
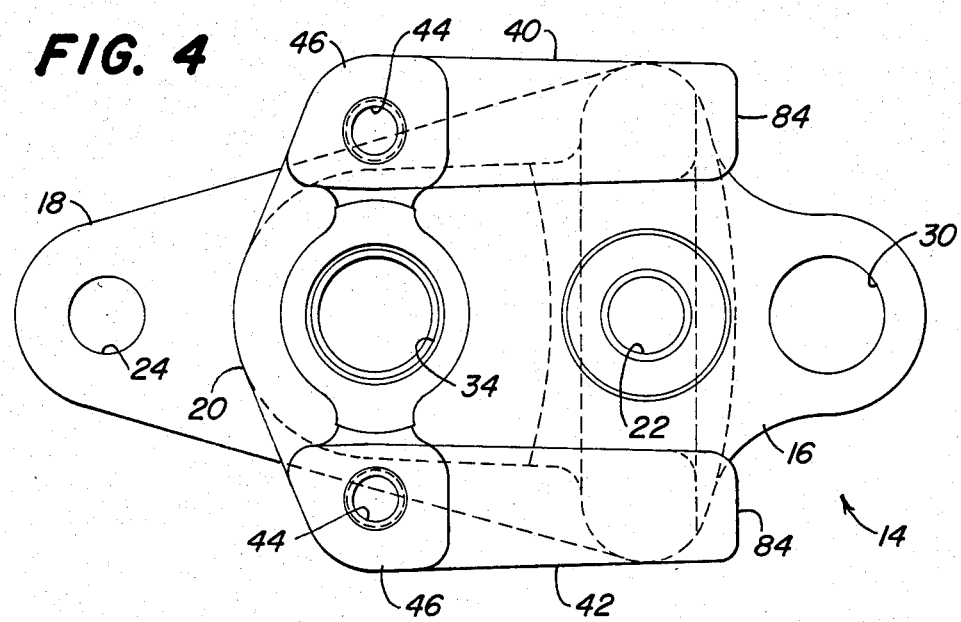
FIG. 4 is a side view of the bracket of the present invention.

Referring now to FIGS. 2–4, the draft sensor 12 includes a bracket 14 with a body 16 from which spaced apart inner and outer legs 18 and 20 extend rearwardly. The body 16 includes a mounting hole 22 and the leg 18 includes a mounting hole 24. The bracket is bolted to the side of the transmission case housing 89 by means of these mounting holes 22, 24. Preferably, the housing 89 and the bracket 14 include a corresponding locating bore 26 and locating stub 28 for reception therein.

A bore 30 extends into the body 16 from the side of the bracket which faces away from the housing 89. A bore 32 extends through inner leg 18 and part way into the stub 28. A bore 34 extends through outer leg 20 and is coaxially aligned with bore 32. The diameter of bore 34 is slightly larger than the diameter of bore 32.

As best seen in FIGS. 3 and 4, a pair of upper and lower side members 40, 42 project away from the outer leg 20. As best seen in FIG. 4, the members 40, 42 extend in a generally fore-and-aft direction and are spaced apart on opposite sides of the outer leg 20. Each member includes a threaded bore 44 in a corresponding raised portion 46 near the aft end of the member.

A load pin 50 is press-fitted into the bore 30 and projects outwardly therefrom. A shaft 52 extends through and between bores 32 and 34. Shaft 52 includes a reduced diameter stem 54 which projects outwardly from bore 34. The portion of shaft 52 between legs 18 and 20 is coupled to the forward end of a generally fore-and-aft extending draft link 51 by a conventional bearing and washer assembly 53.

Figure 5:
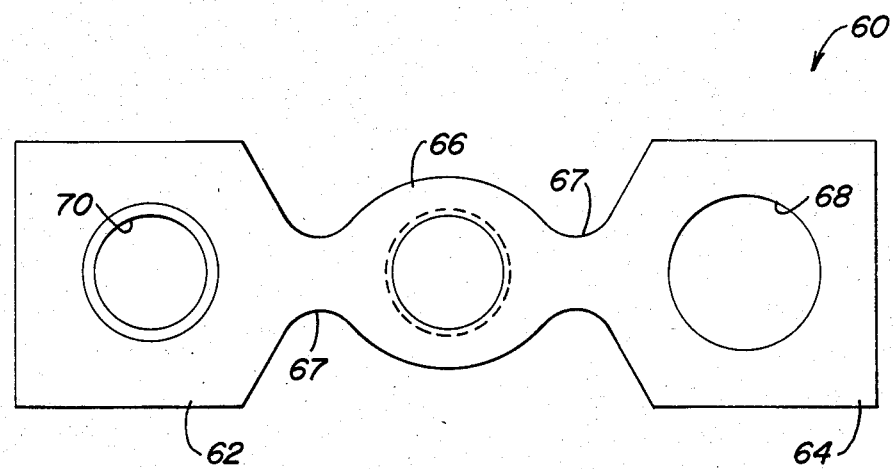
FIG. 5 is a side view of the load strap of the present invention.

Turning now to FIGS. 2 and 5, the draft sensor 12 includes a load strap 60 mounted between side members 40 and 42. As best seen in FIG. 5, the load strap has a modified "dumbell" shape with enlarged generally rectangular ends 62 and 64 and a slightly enlarged and rounded central portion 66. The central portion 66 is connected to each end by a narrow neck portion 67 on either side thereof. This shaping of the load strap enhances the deformation of the central portion for a given force applied through the shaft 52, thus increasing the sensitivity of the measurement. The load strap 60 is coupled to the forward end of bracket 14 by pin 50 which is received with a clearance fit in a bore 68 in the forward end 64 of the load strap 60. The aft end 62 has a bore 70 therein into which the stem 54 is press-fit. A bore 72 extends through the mid portion 66 and receives a known cylindrical strain sensor 74 such as described in U.S. Pat. No. 4,530,245 issued July 23, 1985 to Jacobson and assigned to Revere Corp. of America. The clearance between shaft 52 and bore 34 is larger than the clearance between pin 50 and bore 68 so that fore-and-aft forces which act on the shaft 52 are transmitted to the load strap 60.

A cover 80 is fixed to the bracket 14 by means of bolts which are received by the threaded bores 44 in the side members 40 and 42. The forward end of the cover 80 has a lip 82 formed with two right angle bends. The lip 82 releasably receives an overhanging ledge portion 84 of the walls 40, 42. The lip 82 also abuts and is held in place by the pin 50. These same bolts also attach a shield 86 to the bracket. The shield 86 guides and protects the cable 88 as it leaves the draft sensor 12. The cover 80 also restrains all lateral thrust induced by the draft link 50 resulting from lateral movement of its implement (not shown).

Viewing FIG. 2, the generally fore-and-aft forces which act on the draft link 51 are transmitted to the load strap 60 via the shaft 52 and stem 54, thus the load strap 60 is subject to both compression and extension type forces. These forces produce fore-and-aft strain in the load strap and this strain is sensed by the strain sensor 74 which generates a signal which represents this strain. This signal therefore is related to both compression and tension draft forces in the draft link 51. The bracket prevents strain in the strap due to bending of the shaft and vertical loads on the shaft.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appending claims.

I claim:

1. A draft force sensor for sensing generally fore-and-art loads comprising:
   a bracket comprising a base fixed to a frame of a vehicle and a pair of legs extending from the base, the legs being spaced apart in a direction which is transverse to the fore-and-aft direction;
   a shaft supported by and extending between the legs for movement relative thereto;
   means for coupling a generally fore-and-aft extending draft link to the shaft;
   a generally fore-and-aft extending load strap having one end supported by the bracket and having another end rigidly fixed to the shaft so that fore-and-aft loads on the shaft create fore-and-aft strain in the load strap, the bracket preventing strain in the strap due to bending of the shaft and vertical loads on the shaft; and
   a strain sensor coupled to the load strap for generating a signal representing strain in the load strap.

2. The draft sensor of claim 1, wherein:
   the load strap has an opening therein, the strain sensor being received by the opening.

3. The draft sensor of claim 2, wherein:
   a pair of spaced apart fore-and-aft extending wall members project away from a side of one of the legs, on opposite sides of the load strap.

4. The draft sensor of claim 3, further comprising:
   a cover fixed to and extending between the wall members and extending over a portion of the load strap which includes the opening and the strain sensor.

5. The draft sensor of claim 1, wherein the load strap comprises:
   a central portion having a bore therein for receiving the strain sensor;
   a pair of end portions, each having a larger cross-sectional area in a plane normal to an axis of the shaft than that of the central portion; and
   a pair of neck portions, each connecting the central portion to one of the end portions.

* * * * *